United States Patent [19]

Hibino et al.

[11] Patent Number: 4,803,898
[45] Date of Patent: Feb. 14, 1989

[54] APPARATUS FOR DETECTING A NEUTRAL STATE OF A TRANSMISSION GEAR OF A VEHICLE ENGINE SYSTEM

[75] Inventors: Yoshitaka Hibino; Takeshi Fukuzawa; Hiromitsu Sato; Masahiko Asakura; Atsushi Totsune, all of Wako, Japan

[73] Assignee: Honda Giken Kogyo Kabushiki Kaisha, Tokyo, Japan

[21] Appl. No.: 2,948

[22] Filed: Jan. 13, 1987

[30] Foreign Application Priority Data

Jan. 13, 1986 [JP] Japan .................................. 61-005499

[51] Int. Cl.$^4$ .............................................. B60K 41/08
[52] U.S. Cl. ......................................... 74/860; 74/872
[58] Field of Search ................. 74/856, 857, 859, 860, 74/872, 875; 192/0.062, 0.092, 0.08

[56] References Cited

U.S. PATENT DOCUMENTS

| | | | |
|---|---|---|---|
| 3,707,892 | 1/1973 | Kuroda et al. | 74/860 X |
| 4,165,722 | 8/1979 | Aoyama | 74/860 X |
| 4,257,381 | 3/1981 | Yuzawa et al. | 74/860 X |
| 4,401,073 | 8/1983 | Furuhashi | 74/860 X |
| 4,481,844 | 11/1984 | Ironside et al. | 74/860 X |
| 4,508,088 | 4/1985 | Hasegawa et al. | 74/860 X |
| 4,596,164 | 6/1986 | Hasegawa et al. | 74/860 |
| 4,685,548 | 8/1987 | Holtermann et al. | 192/0.08 |

FOREIGN PATENT DOCUMENTS 0136267  4/1985  European Pat. Off. .............. 74/860

Primary Examiner—Lawrence Staab
Assistant Examiner—Dwight G. Diehl
Attorney, Agent, or Firm—Birch, Stewart, Kolasch & Birch

[57] ABSTRACT

An apparatus for detecting a neutral state of a transmission gear of a vehicle detects an engine rotational speed, a vehicle speed, and a condition in which the engine output power is transmitted to the transmission gear through a clutch. The apparatus judges that the transmission gear is in the neutral state when a ratio between the engine rotational speed and the vehicle speed is in any one of predetermined ranges. The apparatus also judges that the transmission gear is in the neutral state when a variation of the ratio between the engine rotational speed and the vehicle speed within a predetermined time period is greater than a predetermined value.

3 Claims, 5 Drawing Sheets

FIG. 3
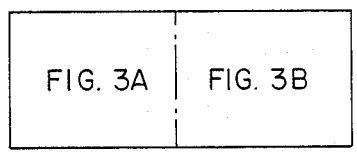
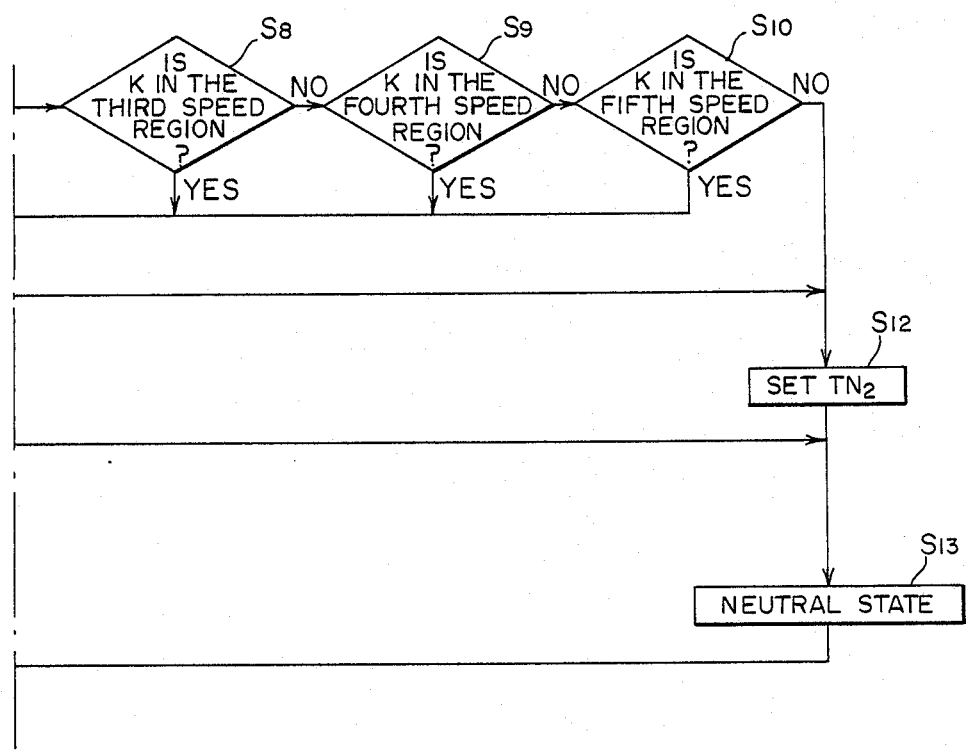
FIG. 3B

APPARATUS FOR DETECTING A NEUTRAL STATE OF A TRANSMISSION GEAR OF A VEHICLE ENGINE SYSTEM

BACKGROUND OF THE INVENTION

1. Field of the Invention

The present invention relates to an apparatus for detecting a state where no gear is engaged (simply referred to as a neutral state hereinafter) of a transmission gear, in an engine system including the transmission gear for transmitting an output torque of a vehicle mounted internal combustion engine to a later stage.

2. Description of Background Information

Transmission gear of a vehicle is provided for transmitting an output torque of a vehicle mounted internal combustion engine to wheels of the vehicle. The internal combustion engine and the transmission gear, in combination, can be designated as an engine system which operates as a source of a desired torque. Various control systems such as an air/fuel ratio control system are known as means for controlling an operation of such an engine system. In those control systems, it is necessary to detect various operational parameters such as rotational speed of engine in the engine system, throttle opening angle, other various parameters of engine operation, sift position of the transmission gear, and vehicle speed. Thus, a plurality of sensors for sensing the operational parameters are provided in those control systems.

Among those sensors, there is a so-called neutral switch which senses a neutral state of the transmission gear. As an example, Japanese Patent Publication No. 49-45256 discloses such a neutral switch.

The neutral switch such as disclosed in the above mentioned patent is generally a mechanical switch interconnected with a gear shift linkage of the transmission gear. Therefore, such a neutral switch is subjected to failures including not only a fault of the switch itself, but other troubles such as a short-circuit between lead wires. In the event that such a failure of the neutral switch occurs, a false signal indicating the neutral state may be supplied to the engine system, to hinder the proper control operation.

OBJECTS AND SUMMARY OF THE INVENTION

An object of the present invention is to provide a neutral state detection apparatus of a vehicle engine system which can detect the neutral state of the transmission gear accurately without using a mechanical sensing switch.

According to the present invention, an apparatus for detecting a neutral state of a transmission gear of an internal combustion engine comprises means for detecting a rotational speed of the engine, means for detecting a vehicle speed, means for detecting a transmission of an engine torque by a clutch, and means for judging that the transmission gear is in the neutral state when a ratio between the detected rotational speed of the engine and the detected vehicle speed is in a predetermined reference width.

BRIEF DESCRIPTION OF THE DRAWINGS

The present invention will become more fully understood from the detailed description given hereinbelow and the accompanying drawing which are given by way of illustration only, and thus are not limitative of the present invention, and wherein:

FIGS. 3A and 3B are, when combined, a flowchart showing each step of the operation of the neutral state detection s according to the present invention;

FIG. 3 shows the juxtaposition of FIGS. 3A and 3B; and

DETAILED DESCRIPTION OF THE PREFERRED EMBODIMENT

Referring to the accompanying drawings, the embodiment of the neutral state detection system according to the present invention provided in an air intake side secondary air supply system will be explained hereinafter.

Figure 1:
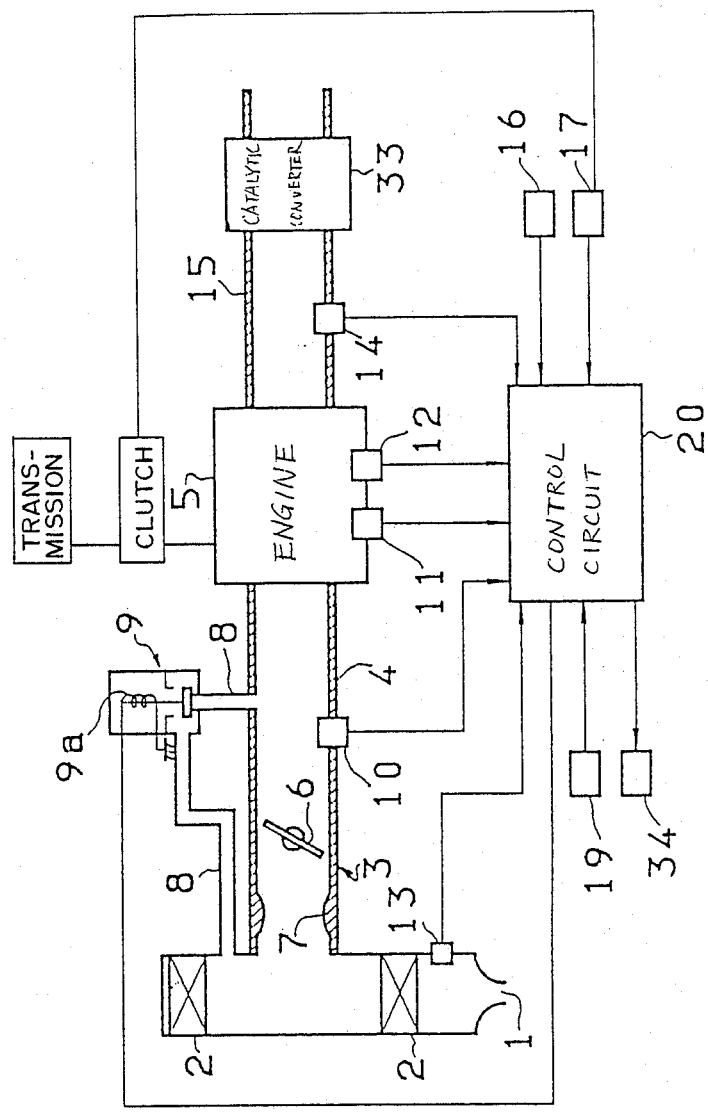
FIG. 1 is a schematic diagram showing a general construction of an air/fuel ratio control system in which a neutral state detection system according to the present invention is suitably provided.

In FIG. 1, an intake air taken at an air inlet port 1 is supplied to an internal combustion engine 5 through an air cleaner 2, a carburetor 3, and an intake manifold 4. The carburetor 3 is provided with a throttle valve 6 and a venturi 7 on the upstream side of the throttle valve 6.

An inside of the air cleaner 2, near an air outlet port, communicates with the intake manifold 4 via an air intake side secondary air supply passage 8. The air intake side secondary air supply passage 8 is provided with an open/close solenoid valve 9. The open/close solenoid valve 9 is designed to open when a drive current is supplied to a solenoid 9a thereof.

The system also includes a first pressure sensor 10 which is provided in the intake manifold 4 for producing an output signal whose level corresponds to an absolute pressure $P_{BA}$ within the intake manifold 4, a rotational speed sensor 11 which produces a pulse signal every predetermined angle revolution of a crankshaft (not shown) of the engine 5. The rotational speed sensor 11 may be a sensor for sensing pulses generated at a primary coil of an ignition coil (not shown) of the engine 5. The reference signal 12 denotes an engine cooling water temperature sensor which produces an output signal whose level corresponds to the temperature of engine cooling water. The system also includes an intake air temperature sensor 13 provided in the vicinity of the atmospheric air inlet port 1 and producing an output signal whose level corresponds to the temperature of the intake air, and an oxygen concentration sensor 14 which is provided in an exhaust manifold 15 of the engine 5 for generating an output signal corresponding to an oxygen concentration in the exhaust gas. Further, a catalytic converter 33 for accelerating the reduction of the noxious components in the exhaust gas is provided in the exhaust manifold 15 at a location on the downstream side of the position of the oxygen concentration sensor 14. The open/close solenoid valve 9, the first pressure sensor 10, the rotational speed sensor 11, the engine cooling water temperature sensor 12, the intake air temperature sensor 13, and the oxygen concentration sensor 14 are electrically connected to a control circuit 20. Further, to the control circuit 20, there are connected a vehicle speed sensor 16 which produces a vehicle speed signal $V_H$ ($V_H$ signal) whose level is proportional to the speed of the vehicle, a clutch switch 17 associated with a clutch (not shown) of the engine system, which turns on when the clutch for transmitting the torque of the engine 5 to a transmission gear (also not shown) is disengaged, a second pressure sensor 19 for producing an output signal having a level corresponding to an atmospheric pressure, and an alarm lamp 34 for displaying an abnormality of any of the sensors. The alarm lamp 34 is, for example, located in a dash board in front of a driver's seat of the vehicle.

Figure 2:
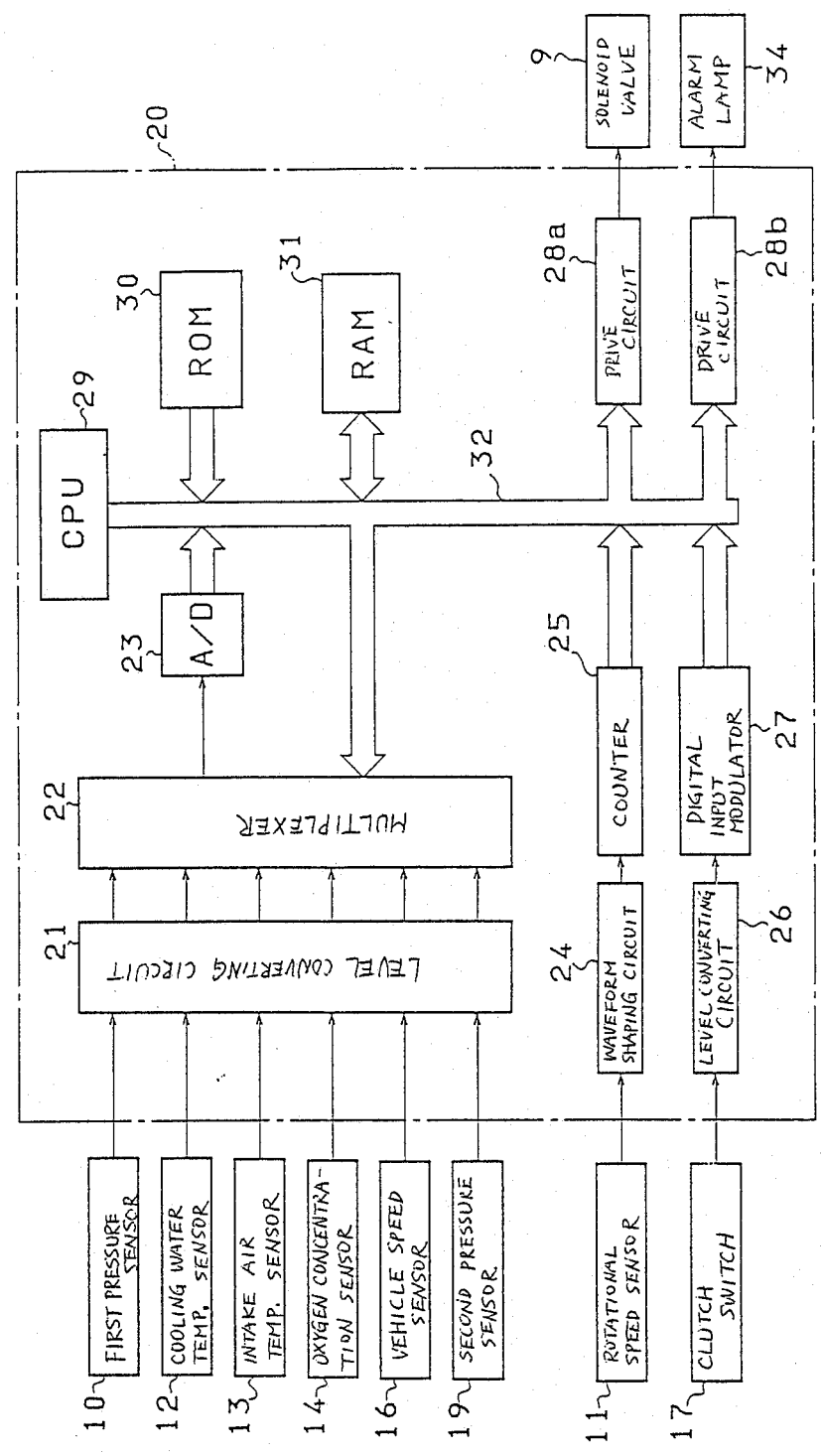
FIG. 2 is a block diagram showing the concrete construction of the control circuit 20 of the system of FIG. 1.

The control circuit 20 includes, as shown in FIG. 2, a level converting circuit 21 which effects a level conversion of the output signals of the first pressure sensor 10, the engine cooling water temperature sensor 12, the intake air temperature sensor 13, the oxygen concentration sensor 14, the vehicle speed sensor 16, and the second pressure sensor 19. Output signals provided from the level converting circuit 21 are in turn supplied to a multiplexer 22 which selectively outputs one of the output signals from each sensor passed through the level converting circuit 21. The output signal provided by the multiplexer 22 is then supplied to an A/D converter 23 in which the input signal is converted into a digital signal. The control circuit 20 further includes a waveform shaping circuit 24 which effects a waveform shaping of the output signal of the rotational speed sensor 11, to provide TDC signals in the form of pulse signals. The TDC signals output from the waveform shaping circuit 24 in the form of pulses (Ne pulses) are in turn supplied to a counter 25 which counts intervals of the TDC signals. The control circuit 20 includes a level converting circuit 26 for converting an output signal level of the clutch switch 17, a digital input modulator 27 for modulating an output signal of the clutch switch 17 through the level converting circuit 26 into digital data, a drive circuit 28a for driving the open-/close solenoid valve 9 in an opening direction, a drive circuit 28b for lighting the alarm lamp 34, a CPU (central processing unit) 29 which performs digital operations according to various programs, and a ROM 30 in which various operating programs and data are previously stored, and a RAM 31. The multiplexer 22, the A/D converter 23, the counter 25, the digital input modulator 27, the drive circuits 28a and 28b, the CPU 29, the ROM 30, and the RAM 31 are mutually connected via an input/output bus 32.

In the thus constructed control circuit 20, information of the absolute pressure $P_{BA}$ in the intake manifold 4, the engine cooling water temperature $T_W$, the intake air temperature $T_A$, the oxygen concentration in the exhaust gas, and the vehicle speed $V_H$, and the atmospheric pressure $P_A$ is selectively supplied from the A/D converter 23 to the CPU 29 via the input/output bus 32. Also information indicative of the engine speed Ne from the counter 25, information of on-off state of the clutch switch 17 from the digital input modulator 27 are supplied to the CPU 29 via the input/output bus 32. The CPU 29 is constructed to generate an internal interruption signal every one duty period $T_{SOL}$ (100 m sec, for instance). In response to this internal interruption signal, the CPU 29 reads each one of the input information mentioned above, and determines an opening time of the open-close solenoid valve 9 in every one duty period $T_{SOL}$ of the control operation. By the opening of the open-close solenoid valve 9 by the drive circuit 28a, during the thus determined opening time, the air intake side secondary air is supplied into the intake manifold 4 through the air intake side secondary air supply passage 8 during the opening time. Thus, the air/fuel ratio of mixture to be supplied to the engine is controlled toward an air/fuel ratio such as a target air/fuel ratio.

The operation of the neutral state detection apparatus according to the present invention which is performed by the CPU 29, will be explained hereinafter with reference to a routine program shown in the operational flowchart of FIGS. 3A and 3B. This routine program is executed in accordance with a clock pulse signal having a predetermined repetition frequency, or a rotation pulse signal corresponding to the rotational speed of the engine.

Figure 3A:
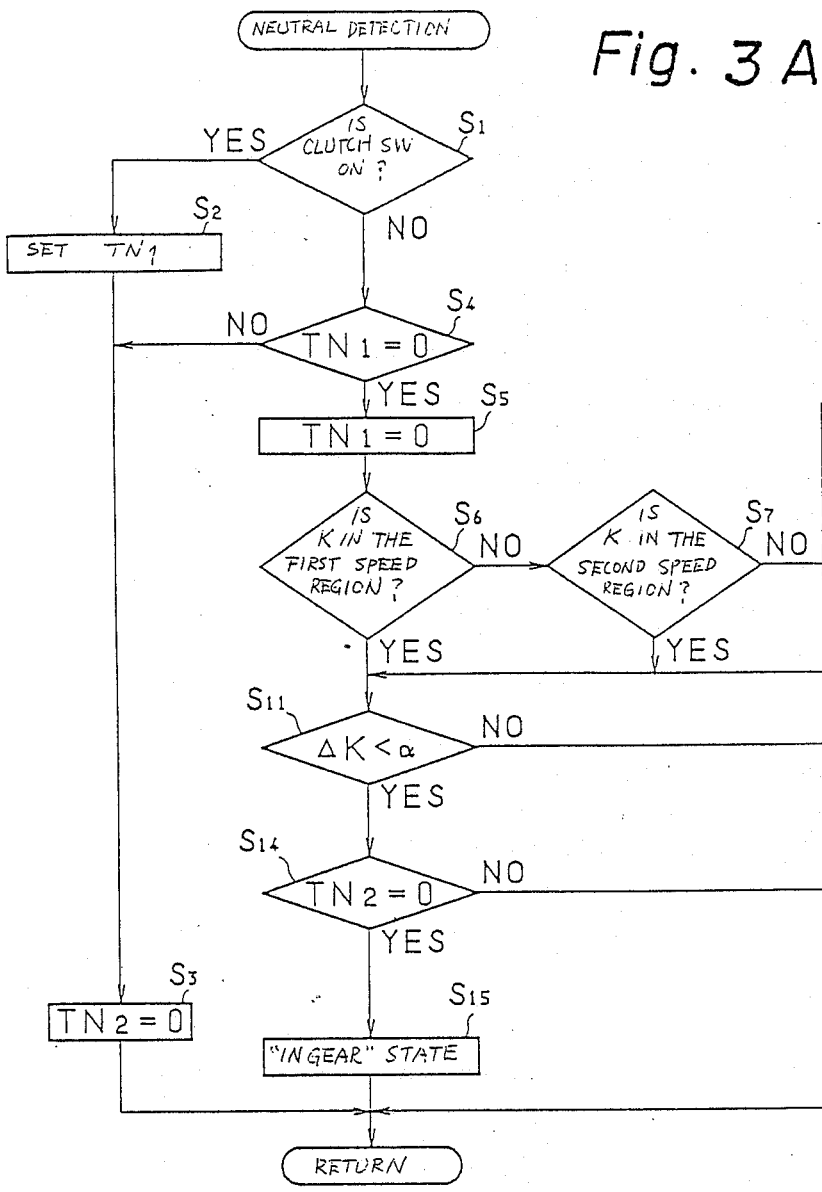

In the operation shown in FIG. 3A, whether or not the clutch switch 17 is "on" is detected at a step $S_1$. If the clutch switch 17 is "on", it indicates an operation in which the clutch pedal (not shown) is depressed to disconnect the power transmission. In this state, a $TN_1$ timer (having a set time of 0.2 second, for example) in the CPU 29 is set at a step $S_2$, and further a $TN_2$ timer (having a set time of 10 seconds, for example) is set to "0" ($TN_2=0$) at a step $S_3$. When the clutch pedal is depressed, the $TN_2$ timer is inactivated, and subsequently the program returns to a main routine. When, on the other hand, the clutch switch 17 is "off" at the step $S_1$, it means that the transmission of engine power is performed by the clutch, whether or not the count time of the $TN_1$ timer is equal to 0 ($TN_1=0$) is detected at a step $S_4$. If $TN_1$ 0, the program goes to the step $S_3$, and if $TN_1=0$ the $TN_1$ timer is set to 0 ($TN_1=0$) at a step $S_5$. In other words, at the step S4, a delay time $TN_1$ is provided so as to prevent an erroneous judgement immediately after a transition of the switch position of the clutch switch 17 from the "on" state to the "off" state.

Figure 4:
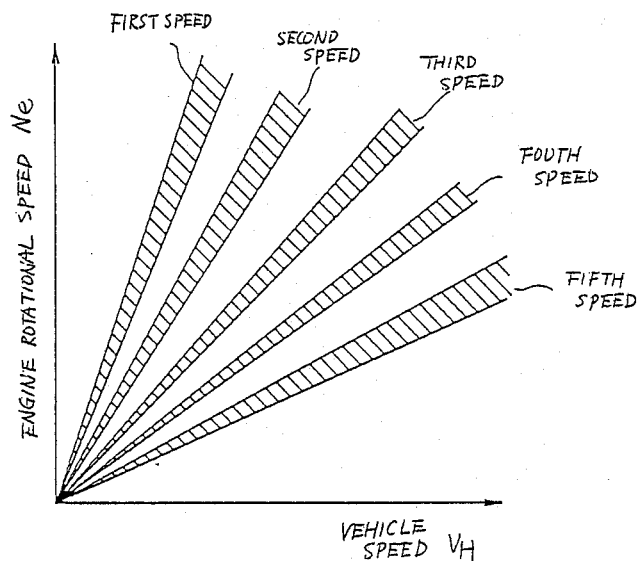
FIG. 4 is a diagram showing a range of variation of the engine speed with respect to the vehicle speed at each shift position.

Through steps $S_6$–$S_{10}$ which will be explained hereinafter, whether the transmission gear is engaged or in the neutral state is judged on the basis of a ratio K between the engine rotational speed Ne and the vehicle speed $V_H$. FIG. 4 shows a relationship between the vehicle speed $V_H$ and the engine rotational speed Ne under a plurality of shift positions of the transmission gear. As shown by the areas covered by oblique lines in this figure, the vehicle speed VH and the engine rotational speed Ne deviate within a range, in each of the first through fifth shift positions. In this particular example, the ranges are shown for a five speed transmission gear. However, it is needless to say that such ranges of $V_H$ and Ne are determined for each shift position in any type of transmission gear, such as a three speed transmission gear. The portions of this figure other than those portions covered by oblique lines represent a neutral area. Therefore, by knowing the value of the ratio K ($K=Ne/V_H$), the shift position at that time can be determined. More specifically, with a data map of gear shift positions using the engine rotational speed Ne and the vehicle speed $V_H$ as parameters, stored in a suitable memory means such as the ROM 30, the shift position can be judged from the ratio K calculated by the engine rotational speed Ne and the vehicle speed $V_H$ calculated from the Ne pulse and the $V_H$ signal.

On the basis of the above mentioned relationship between the engine speed Ne and the vehicle speed $V_H$, whether or not the transmission gear is engaged (in-gear state) or in the neutral state is presumed from the value of the ratio K ($K=Ne/V_H$) through steps $S_6$ through $S_{10}$. At the step $S_6$, whether or not the value of the ratio K calculated in the CPU 29 falls in a range of variation corresponding to the first speed shift position (referred to as a first speed region hereinafter) is detected. If the value of the ratio K is in the first speed region, it is presumed that the transmission gear is engaged, and the program goes to a step $S_{11}$. If the value of the ratio K is not in the first speed region at the step $S_6$, then whether or not the value of the ratio K falls in a second speed range (a range of variation corresponding to the second speed shift position of the transmission gear) is detected at the step $S_7$. Similarly, at the steps $S_8$ through $S_{10}$, whether or not the value of the ratio K falls in a third speed region through fifth speed region respectively, is detected. If the value of the ratio K falls in any one of the third through fifth speed region, the programs goes to the step $S_{11}$. If, on the other hand, the value of the ratio K does not fall in any of the third through fifth speed region, it is presumed that the transmission gear is in the neutral state, and the program goes to a step $S_{12}$. At the step $S_{12}$, the timer $TN_2$ (having the set time of 10 seconds, for example) is set, and subsequently a flag $F_{L2}$ indicating whether or not the transmission gear is in the neutral state (if F=1, it indicates the neutral state) is set to be equal to "1" ($F_{L2}=1$) at a step $S_{13}$.

On the other hand, if it is presumed that the transmission gear is engaged, at any of the steps $S_6$ through $S_{10}$, whether or not a variation ΔK of the ratio K of the rotational speed of the engine Ne and the vehicle speed $V_H$ within a predetermined time period is smaller than a predetermined value Δ(2, for example) at the step $S_{11}$. If ΔK>α, that is, if the variation of the ratio K is large, it is presumed that the transmission gear is in the neutral state, and the program goes to a step $S_{12}$ from the step $S_{11}$. If, on the other hand, ΔK<α(, whether or not $T_{N2}$ is equal to 0 ($T_{N2}=$) , that is, whether or not a time period of 10 seconds has elapsed, is detected at a step $S_{14}$. If 10 seconds have not elapsed, the program goes to the step $S_{13}$, to presume that the transmission gear is in the neutral state for about 10 seconds. If 10 second have elapsed, a flag $F_{L1}$ indicating whether or not the transmission gear is engaged (if $F_{LI}=1$, it indicates that the transmission gear is engaged) is set to "1" at a step $S_{15}$.

In short, in the above-described operation of judgement, it is judged, for a predetermined time period (about 10 seconds), that the transmission gear is in the neutral state if the ratio K falls in any of the regions for judging the neutral state at least one time when the clutch pedal is not depressed, for example, when the vehicle is coasting with the neutral state of the transmission gear, or when the variation of the ratio K is large although it is determined that the transmission gear is engaged, such as a time of a "snap" i.e. a state in which the vehicle speed does not increase rapidly while the acceleration pedal is depressed rapidly unless, the clutch pedal is depressed subsequently. This type of judgement is adopted in the present invention on the basis of the fact that a driver of the vehicle will not engage the transmission gear without depressing the clutch pedal once the driver shifts the transmission gear in the neutral state, and a fact that the variation of the ratio K must be small if the transmission gear is really engaged or in the "in gear" state.

Therefore, when the value of the ratio K falls in the region for judging the "in gear" state temporarily during the coasting of the vehicle with the transmission gear of the neutral state, or when a "snap" occurs although the ratio K is in the region for judging the "in gear" state, it is prevented to judge that the transmission gear is engaged. Therefore, it becomes possible to stop particular engine control operations such as a fuel cut operation or a large shift of the air/fuel ratio on the lean side, during the above mentioned states of the vehicle operation. Thus, problems such as an engine stall or a unstable idle operation are prevented. Moreover, by judging the neutral state of the transmission gear for only a limited time period, it becomes possible to prevent such a circumstance that the judgement of the neutral state is continued until the clutch pedal is depressed subsequently, as a result of a false judgement of the neutral state because of a malfunction when the transmission gear is engaged. For instance, when the vehicle is driven along time with a constant gear position, such as a time of cruising on an expressway, the above mentioned circumstance can be avoided and a proper operation of the engine control system can be maintained.

Thus, in the neutral state detection apparatus according to the present invention, the operation of the transmission gear is detected to be in the neutral state when the ratio between the engine rotational speed and the vehicle speed falls in any one of predetermined regions while the engine power is transmitted by the clutch so that the rotational speed of the engine is stabilized. Thus, the neutral state is electrically detected without using any mechanical switch, so that the detection of neutral state is performed properly, and a proper operation of the engine control system is maintained. The reliability of the system in total is greatly improved in this way.

What is claimed is:

1. An apparatus for detecting a neutral state of a transmission gear of a vehicle having an internal combustion engine and said transmission gear for transmitting an output torque of said internal combustion engine supplied through a clutch, comprising:
   means for detecting a rotational speed of said internal combustion engine;
   means for detecting a vehicle speed;
   means for detecting a condition in which said output torque of said internal combustion engine is transmitted by said clutch to said transmission gear; and
   judging means which receive detection signals from said means for detecting, for judging that said transmission gear is operated in the neutral state when a ratio between said rotational speed of said internal combustion engine and said vehicle speed is outside of a plurality of ranges determined correspondingly to each shift position of said transmission gear while said output torque of said internal combustion engine is transmitted to said transmission gear by said clutch.

2. An apparatus as set forth in claim 1 wherein said judging means further includes an operation for judging that said transmission gear is operated in the neutral state when a variation of said ratio between said rotational speed of said internal combustion engine and said vehicle speed within a predetermined time period is greater than a predetermined value.

3. An apparatus as set forth in claim 1, wherein said judging means judge that said transmission gear is operated in the neutral state for a predetermined time period after once judging the neutral state, unless said clutch is operated to be disengaged one time.

* * * * *